(12) United States Patent
Chen et al.

(10) Patent No.: US 11,835,678 B2
(45) Date of Patent: Dec. 5, 2023

(54) WEATHER DATA WITH CONNECTED VEHICLES

(71) Applicant: GM Global Technology Operations LLC, Detroit, MI (US)

(72) Inventors: Jinzhu Chen, Troy, MI (US); Fan Bai, Ann Arbor, MI (US); Donald K. Grimm, Utica, MI (US); Richard Gordon, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 115 days.

(21) Appl. No.: 17/556,009

(22) Filed: Dec. 20, 2021

(65) Prior Publication Data
US 2023/0194752 A1    Jun. 22, 2023

(51) Int. Cl.
*G01W 1/10* (2006.01)
*B60Q 9/00* (2006.01)
(Continued)

(52) U.S. Cl.
CPC ............... *G01W 1/10* (2013.01); *B60Q 9/00* (2013.01); *G07C 5/008* (2013.01); *G07C 5/0808* (2013.01);
(Continued)

(58) Field of Classification Search
CPC ..... G01W 1/10; G01W 2203/00; G01W 1/00; G01W 1/18; B60Q 9/00; G07C 5/008;
(Continued)

(56) References Cited

U.S. PATENT DOCUMENTS

2019/0339416 A1* 11/2019 Elkabetz ................ G08G 5/025
2020/0276977 A1*  9/2020 Saleh ................ B60W 50/0098
(Continued)

FOREIGN PATENT DOCUMENTS

DE    102020103719 A1 *  8/2021
JP       2021092396 A  *  6/2021    .............. G01W 1/00

OTHER PUBLICATIONS

Mercelis et al. ("Towards Detection of Road Weather Conditions using Large-Scale Vehicle Fleets," 2020 IEEE 91st Vehicular Technology Conference (VTC2020-Spring), Antwerp, Belgium, 2020, pp. 1-7, doi: 10.1109/VTC2020-Spring48590.2020.9128484) (Year: 2020).*

*Primary Examiner* — Alessandro V Amari
*Assistant Examiner* — Christian T Bryant
(74) *Attorney, Agent, or Firm* — Vivacqua Crane PLLC (57) ABSTRACT

A system for providing weather conditions to a target vehicle includes a plurality of sensors mounted within the target vehicle adapted to measure weather conditions at the target vehicle and a computer processor adapted to collect data of weather conditions at the target vehicle from the plurality of sensors mounted within the target vehicle, collect data of measured weather conditions of at least one known location remote from the target vehicle, and build a temporal-spatial effectiveness model adapted to estimate weather conditions of at least one unknown location remote from the target vehicle using the data of weather conditions at the target vehicle and the data of measured weather conditions of the at least one known location remote from the target vehicle.

12 Claims, 3 Drawing Sheets

(51) Int. Cl.
| | |
|---|---|
| *H04W 4/46* | (2018.01) |
| *G01W 1/18* | (2006.01) |
| *G01W 1/00* | (2006.01) |
| *G07C 5/00* | (2006.01) |
| *G07C 5/08* | (2006.01) |

(52) U.S. Cl.
CPC ........... *B60W 2555/20* (2020.02); *G01W 1/00* (2013.01); *G01W 1/18* (2013.01); *G01W 2203/00* (2013.01); *H04W 4/46* (2018.02)

(58) Field of Classification Search
CPC ... G07C 5/0808; H04W 4/46; B60W 2555/20
See application file for complete search history.

(56) References Cited

U.S. PATENT DOCUMENTS

| | | | |
|---|---|---|---|
| 2021/0223433 A1* | 7/2021 | Wahabzada | G06F 30/27 |
| 2022/0042819 A1* | 2/2022 | Bonnet | G08G 1/096716 |
| 2023/0026008 A1* | 1/2023 | Bonnet | G01W 1/10 |
| 2023/0069833 A1* | 3/2023 | Frey | G01W 1/10 |

\* cited by examiner

WEATHER DATA WITH CONNECTED VEHICLES

INTRODUCTION

The present disclosure relates to a system and method of determining weather conditions at and near a target vehicle. More specifically, a system and method of the present disclosure uses data collected from connected data sources and connected vehicles to determine weather conditions at a target vehicle and at locations near a target vehicle for which actual data is not available.

In vehicles, current systems use data collected by sensors within the vehicle to determine the weather conditions at the target vehicle. In addition, vehicles can collect data from external sources that provide information on weather conditions at other locations.

However, current systems and methods must guess what weather conditions are at unknown locations, remote from the target vehicle, for which no actual weather data is available from neither vehicle sensors nor other weather sources. Further, during a cold start, onboard vehicle sensors may provide inaccurate data until the sensors have been allowed to acclimate to the weather conditions at the target vehicle. For example, when a target vehicle is started in extremely hot or cold temperatures, temperature sensors onboard the target vehicle will not provide accurate data until the vehicle begins to move and the temperature sensors are exposed to moving external air. In another example, when a target vehicle is located in direct sunlight, in extremely hot temperatures, during a cold start, temperature sensors within the vehicle may provide exaggerated high temperature data due to overheated air surrounding the temperature sensors.

Thus, while current systems and methods achieve their intended purpose, there is a need for a new and improved system and method for determining weather conditions at and near a target vehicle by using data collected from connected data sources and connected vehicles to determine weather conditions at a target vehicle and at locations near a target vehicle for which actual data is not available. Further there is a need for a new and improved system and method that filters data collected from vehicle sensors until such sensors have acclimated to the surrounding weather conditions.

SUMMARY

According to several aspects of the present disclosure, a method for providing weather conditions to a target vehicle includes collecting, with a computer processor, data of weather conditions at a target vehicle with a plurality of sensors mounted within the target vehicle, collecting, with the computer processor, data of measured weather conditions of at least one known location remote from the target vehicle, and building, with the computer processor, a temporal-spatial effectiveness model to estimate weather conditions of at least one unknown location remote from the target vehicle using the data of weather conditions at the target vehicle and the data of measured weather conditions of the at least one known location remote from the target vehicle.

According to another aspect, the method further includes filtering the data of weather conditions at the target vehicle during a cold start event of the target vehicle by ignoring the data of weather conditions at the target vehicle until the plurality of sensors within the target vehicle become acclimated.

According to another aspect, the filtering the data of weather conditions at the target vehicle during a cold start event of the target vehicle by ignoring the data of weather conditions at the target vehicle until the plurality of sensors within the target vehicle become acclimated further includes comparing the data of weather conditions at the target vehicle to the data of measured weather conditions of the at least one known location remote from the target vehicle, and ignoring the data of weather conditions at the target vehicle when the data of weather conditions at the target vehicle are unreliable in light of the data of measured weather conditions of the at least one known location remote from the target vehicle.

According to another aspect, the filtering the data of weather conditions at the target vehicle during a cold start event of the target vehicle by ignoring the data of weather conditions at the target vehicle until the plurality of sensors within the target vehicle become acclimated further includes accessing a model that predicts an acclimation delay time vs. an average speed of the target vehicle, tracking the average speed of the target vehicle, and ignoring the data of weather conditions at the target vehicle for an acclimation delay time based on the tracked average speed of the target vehicle starting at a cold start event of the target vehicle.

According to another aspect, the collecting, with the computer processor, data of measured weather conditions of at least one known location remote from the target vehicle further includes communicating, via a wireless network, with at least one other vehicle, and collecting measured weather conditions from the at least one other vehicle.

According to another aspect, the collecting, with the computer processor, data of measured weather conditions of at least one known location remote from the target vehicle further includes communicating, via a wireless network, with at least one source that collects and reports weather conditions, and collecting measured weather conditions from the at least one source that collects and reports weather conditions.

According to another aspect, the computer processor is located within an edge/cloud-based infrastructure, the method further including communicating with an infotainment system within the target vehicle, via a wireless network.

According to another aspect, the building, with the computer processor, a temporal-spatial effectiveness model to estimate weather conditions of at least one unknown location remote from the target vehicle using the data of weather conditions at the target vehicle and the data of measured weather conditions of the at least one known location remote from the target vehicle further includes interpolating temporal-spatial estimations across a pre-defined two-dimensional area.

According to another aspect, the method further includes calculating a significance value for the data of measured weather conditions.

According to another aspect, the building, with the computer processor, a temporal-spatial effectiveness model to estimate weather conditions of at least one unknown location remote from the target vehicle using the data of weather conditions at the target vehicle and the data of measured weather conditions of the at least one known location remote from the target vehicle further includes aggregating data of measured weather conditions of the at least one known location remote from the target vehicle within the predetermined two-dimensional area.

According to another aspect, the calculating a significance value for the data of measured weather conditions further includes isolating effects of temporal decay and spatial decay on the significance value.

According to several aspects of the present disclosure, a system for providing weather conditions to a target vehicle includes a plurality of sensors mounted within the target vehicle adapted to measure weather conditions at the target vehicle, and a computer processor adapted to collect data of weather conditions at the target vehicle from the plurality of sensors mounted within the target vehicle, collect data of measured weather conditions of at least one known location remote from the target vehicle, and build a temporal-spatial effectiveness model adapted to estimate weather conditions of at least one unknown location remote from the target vehicle using the data of weather conditions at the target vehicle and the data of measured weather conditions of the at least one known location remote from the target vehicle.

According to another aspect, the computer processor is further adapted to filter the data of weather conditions at the target vehicle during a cold start event of the target vehicle by ignoring the data of weather conditions at the target vehicle until the plurality of sensors within the target vehicle become acclimated.

According to another aspect, the computer processor is adapted to filter the data of weather conditions at the target vehicle during a cold start event by one of comparing the data of weather conditions at the target vehicle to the data of measured weather conditions of the at least one known location remote from the target vehicle, and ignoring the data of weather conditions at the target vehicle when the data of weather conditions at the target vehicle are unreliable in light of the data of measured weather conditions of the at least one known location remote from the target vehicle, and accessing a model that predicts an acclimation delay time vs. an average speed of the target vehicle, tracking the average speed of the target vehicle, and ignoring the data of weather conditions at the target vehicle for an acclimation delay time based on the tracked average speed of the target vehicle starting at a cold start event of the target vehicle.

According to another aspect, the computer processor is adapted to communicate via a wireless network with at least one other vehicle and collect measured weather conditions from the at least one other vehicle.

According to another aspect, the computer processor is adapted to communicate via a wireless network with at least one source that collects and reports weather conditions and collect measured weather conditions from the at least one source that collects and reports weather conditions.

According to another aspect, the computer processor is located within an edge/cloud-based infrastructure and is adapted to communicate with an infotainment system within the target vehicle via a wireless network.

According to another aspect, the computer processor, when building the temporal-spatial effectiveness model to estimate weather conditions of at least one unknown location remote from the target vehicle using the data of weather conditions at the target vehicle and the data of measured weather conditions of the at least one known location remote from the target vehicle is adapted to interpolate temporal-spatial estimations across a pre-defined two-dimensional area.

According to another aspect, the computer processor is adapted to calculate a significance value for the data of measured weather conditions and to isolate effects of temporal decay and spatial decay on the significance value.

According to another aspect, when building a temporal-spatial effectiveness model to estimate weather conditions of at least one unknown location remote from the target vehicle using the data of weather conditions at the target vehicle and the data of measured weather conditions of the at least one known location remote from the target vehicle, the computer processor is further adapted to aggregate data of measured weather conditions of the at least one known location remote from the target vehicle within a pre-determined two-dimensional area.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module or controller refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 1:
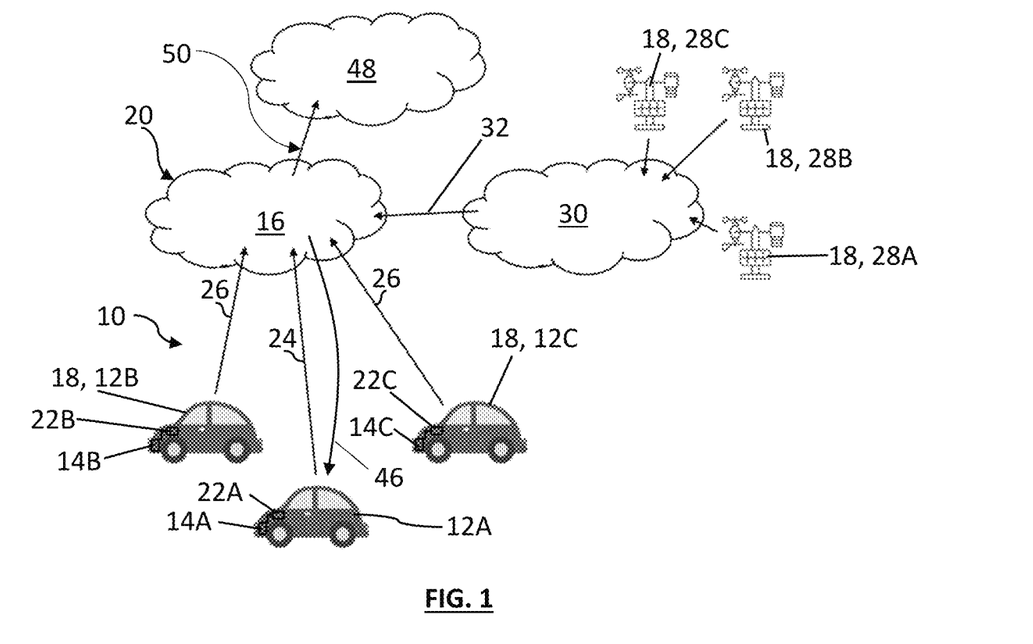
FIG. 1 is a schematic diagram of a system according to an exemplary embodiment of the present disclosure.

Referring to FIG. 1, a system 10 for providing weather conditions to a target vehicle 12 includes a plurality sensors 14A mounted within the target vehicle 12A that are adapted to measure weather conditions at the target vehicle 12A. The plurality of sensors 14A includes different types of sensors that collect data relevant to determining surrounding weather conditions. The plurality of sensors 14A may include, but are not limited to sensors that monitor temperature, humidity, operating level of windshield wipers, location of the target vehicle 12A and speed of the target vehicle 12A.

The system 10 further includes a computer processor 16 that is adapted to collect data of weather conditions at the target vehicle 12A from the plurality of sensors 14A mounted within the target vehicle 12A, collect data of measured weather conditions of at least one known location 18 remote from the target vehicle, and build a temporal-spatial effectiveness model adapted to estimate weather conditions of at least one unknown location remote from the target vehicle 12A using the data of weather conditions at the target vehicle 12A and the data of measured weather conditions of the at least one known location 18 remote from the target vehicle 12A.

As shown in FIG. 1, the computer processor 16 collects data of weather conditions at the target vehicle 12A from the plurality of sensors 14A mounted within the target vehicle 12A. In an exemplary embodiment, the computer processor 16 is located within an edge/cloud-based infrastructure 20 and is adapted to communicate with an infotainment system 22A within the target vehicle 12A via a wireless network. The infotainment system 22A within the target vehicle 12 is connected to and receives data from the plurality of sensors 14A onboard the target vehicle 12A and communicates the data wirelessly to the computer processor 16, as indicated by arrow 24.

The computer processor 16 further collects data of measured weather conditions of at least one known location 18 remote from the target vehicle 12A. One example of such a known location is other vehicles, wherein, the computer processor 16 is adapted to communicate via a wireless network with at least one other vehicle and collect measured weather conditions from the at least one other vehicle. As shown, two other vehicles 12B, 12C are in communication with the computer processor 16 by wireless communication between the computer processor 16 and infotainment systems 22B, 22C onboard each of the other vehicles 12B, 12C. Each of the other vehicles 12B, 12C also has a plurality of onboard sensors 14B, 14C adapted to measure data relevant to weather conditions at the other vehicles 12B, 12C. The infotainment systems 22B, 22C of each of the other vehicles 12B, 12C collect data from the plurality of sensors 14B, 14C within each of the other vehicles 12B, 12C and communicate such data back to the computer processor 16, as indicated by arrows 26.

Another example of such a known location 18 is a source that collects and reports weather conditions. As shown, three such sources 28A, 28B, 28C are shown. Such sources 28A, 28B, 28C may be weather databases, weather radio/television stations or weather APIs. Such sources 28A, 28B, 28C upload weather forecast and historical information in near real time to the internet 30 from which the computer processor 16 can access, as indicated by arrow 32. Such data is gathered by actual data collection methods at various locations and is generally accurate and reliable. The computer processor 16 is adapted to communicate via a wireless network with the internet 30 and collect measured weather conditions that are uploaded from the sources 28A, 28B, 28C.

The computer processor 16 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

In an exemplary embodiment, the computer processor 16 is further adapted to filter the data of weather conditions at the target vehicle 12A during a cold start event of the target vehicle 12A by ignoring the data of weather conditions at the target vehicle 12A until the plurality of sensors 14A within the target vehicle 12A become acclimated. During a cold start, onboard vehicle sensors 14A may provide inaccurate or exaggerated data until the sensors 14A have been allowed to acclimate to the weather conditions at the target vehicle 12A.

In one exemplary embodiment, the computer processor 16 is adapted filter the data of weather conditions at the target vehicle 12A during a cold start event by reference estimation. The computer processor 16 compares the data of weather conditions collected from onboard sensors 14A within the target vehicle 12A to the data of measured weather conditions of the at least one known location 18 remote from the target vehicle 12A, and ignoring the data from the plurality of sensors 14A when the data of weather conditions at the target vehicle 12A are unreliable in light of the data of measured weather conditions of the at least one known location 18 remote from the target vehicle 12A. If the data collected from the onboard sensors 14A is dramatically different than data collected from nearby known locations 18 for which data has been provided, the computer processor 16 will ignore the data of weather conditions collected from the plurality of sensors 14A onboard the target vehicle 12A.

When there are existing weather readings nearby, such as temperature readings, the known readings are used to estimate reference readings for the starting target vehicle 12A. Where $T_i$ represents the $i^{th}$ nearby readings, and $D_i$ represents the distance between the $i^{th}$ nearby reading and the target vehicle, the weighted average reference estimation (WARE) is given by:

$$T = \sum_i \frac{|D_i^{max} - D_i|}{\sum_i |D_i^{max} - D_i|} \cdot T_i$$

The weighted variance reference estimation (WARE) is given by:

$$\sigma^2 = \sum_i \frac{|D_i^{max} - D_i|}{\sum_i |D_i^{max} - D_i|} \cdot (T_i - T)^2$$

Thus, when target vehicle readings satisfy a normal distribution $N(T, k\sigma^2)$, (where k is a scaling factor that may be calibrated) the readings become valid, and the computer processor 16 will stop ignoring the data collected from the plurality of sensors 14A onboard the cold started target vehicle 12A.

For example, if a target vehicle 12A is located in direct sunlight on an extremely hot day where the temperature is 90 degrees, the air surrounding temperature sensors 14A onboard the target vehicle 12A may be surrounded by super-heated air that is in excess of 100 degrees. When the target vehicle 12A is first started, the onboard temperature sensor may provide data indicating a temperature of 110 degrees. Once the target vehicle 12A is started and driven, air is circulated around the temperature sensor, and after some time, the temperature sensor will provide more accurate data indicating temperature at or near 90 degrees. Thus, when first started, the computer processor 16 will compare data of weather conditions collected from onboard sensors 14A within the target vehicle 12A, indicating temperature of 110 degrees, to the data of measured weather conditions of the at least one known location 18 remote from the target vehicle 12A, indicating temperatures closer to 90 degrees, and the computer processor 16 will ignore the data received from the plurality of onboard sensors 14A until the data received from the plurality of onboard sensors 14A more closely matches the data received.

In another exemplary embodiment, the computer processor 16 is adapted filter the data of weather conditions at the target vehicle 12A during a cold start event by accessing a model 34 that predicts an acclimation delay time vs. an average speed of the target vehicle, tracking the average speed of the target vehicle 12A, and ignoring the data of weather conditions at the target vehicle 12A for an acclimation delay time based on the tracked average speed of the target vehicle 12A starting at a cold start event of the target vehicle 12A.

Figure 2:
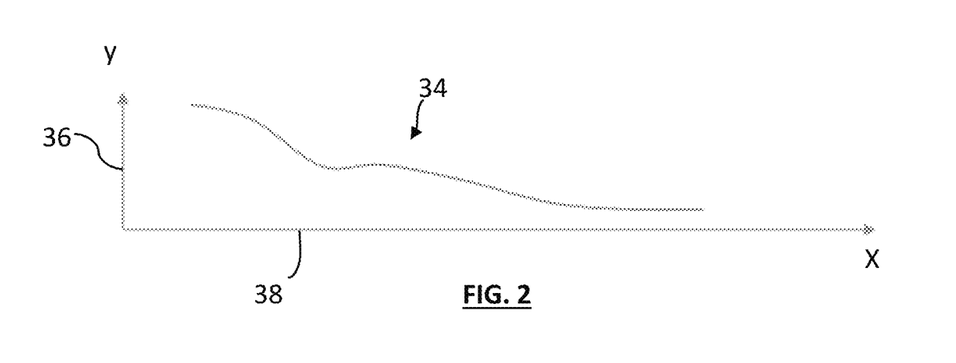
FIG. 2 is a graph plotting acclimating delay time vs. average vehicle speed.

Referring to FIG. 2, over time the target vehicle 12A reports an acclimation delay time, t, and average speed, v. A curve can be learned, wherein the y-axis 36 represents acclimation delay time and the x-axis 38 represents average speed of the target vehicle, and stored by the computer processor 16 aggregating results from similar vehicles. Regression (as an example, but not limited to) can be used to generate the curve from such crowd sourced data. By tracking the average speed of the target vehicle 12A, an acclimation delay time can be determined from the curve, and after such acclimation delay time has passed, the computer processor 16 will stop ignoring the data collected from the plurality of sensors 14A onboard the cold started target vehicle 12A.

When building the temporal-spatial effectiveness model to estimate weather conditions of at least one unknown location remote from the target vehicle 12A using the data of weather conditions at the target vehicle 12A and the data of measured weather conditions of the at least one known location 18 remote from the target vehicle 12A, the computer processor 16 is adapted to interpolate temporal-spatial estimations across a pre-defined two-dimensional area. This allows the system to use data from the target vehicle 12A and data from known locations 18 nearby the target vehicle 12A to create a temporal-spatial effectiveness model to estimate weather conditions at any location within the two-dimensional area for which no data is available.

When building the temporal-spatial effectiveness model, the computer processor 16 is adapted to calculate a significance value for the data of measured weather conditions and to isolate effects of temporal decay and spatial decay on the significance value. The significance value of any individual measurement or reading is $b_0$ at the time when the reading becomes valid, ie. after a cold start delay. The significance value is an indicator of how trustful the measurement or reading data is.

Temporal decay is a measure of how the significance value decays over time. Once data has been collected, as time passes, the data becomes less reliable. Linear decay or exponential decay are example decay functions (but not limited to) as:

$$b(t)=b_0-k\cdot t$$

for linear decay, and as:

$$b(t)=b_0\cdot e^{-\lambda t}$$

for exponential decay.

Spatial decay is a measure of how the significance value decays relative to the distance between the target vehicle 12A and a known location from which data is collected. Data from known locations 18 further away are less reliable than data from known locations 18 that are closer to the target vehicle 12A. Similarly, linear decay or exponential decay are example decay functions (but not limited to). Thus, for example, the temperature at d distance away from measurement at time t is:

$$b(t, d)'=b(t)-k\cdot d,$$

for linear decay, and is:

$$b(t, d)'=b(t)\cdot e^{-\lambda d},$$

for exponential decay.

In an exemplary embodiment, when building the temporal-spatial effectiveness model to estimate weather conditions at an unknown location, $l_0$, having N neighbors, $l_1$, $l_2, \ldots l_N$, the distance is $|l_0-l_n|$, and sensor measurements at the neighbors are $m_1, m_2, \ldots m_N$ measures at time $t_1$, $t_2, \ldots t_N$ respectively. The estimated sensor measurement $M_0$ at the unknown location $l_0$ at time t is given by:

$$b_n(t, d_n)=b_0\cdot e^{-\lambda_t(t-t_n)}\cdot e^{-\lambda_d|l_0-l_n|}$$

or, $$b_n(t, d_n)=b_0\cdot e^{-\lambda_t(t-t_n)-\lambda_d|l_0-l_n|}$$

wherein, the estimated measurement is given by:

$$\hat{m}_0 = \frac{\sum_n b_n(t, d_n)\cdot r_n}{\sum_n b_n(t, d_n)},$$

and, the significance value is given by:

$$\hat{b}_0 = \frac{\sum b_n(t, d_n)}{N}.$$

When building a temporal-spatial effectiveness model the computer processor 16 is further adapted to aggregate data of measured weather conditions of the at least one known location 18 remote from the target vehicle 12A within a pre-determined area. For many vehicle applications, the readings can be estimated at road segment level or grid level for different granularity. The current system 10 provides the flexibility to estimate by aggregating data in one of the segment and grid level.

Once data are grouped in a road segment or grid, the temporal and spatial variance can be estimated from independent analysis, respectively. The significance value can be decayed more slowly when the variance is small and faster when the variance is large. When isolating effects of temporal decay, a small road segment or grid is selected. Calculating from a small region means the temporal-spatial effectiveness is dominated by temporal effectiveness, ie, ($\lambda_d$=0), and the estimated sensor measurement $M_0$ at the unknown location $l_0$ at time t is given by:

$$b_n(t, d_n) = b_0 \cdot e^{-\lambda(t-t_n)}$$

When isolating effects of spatial decay, data is sampled from
different locations at the same time, and temporal-spatial effectiveness is dominated by spatial effectiveness, ie., ($\lambda_r$=0), and the estimated sensor measurement $M_0$ at the unknown location lo at time t is given by:

$$b_n(t, d_n) = b_0 \cdot e^{-\lambda|l_0-l_n|}$$

To proceed, a variance-based coefficient, $\lambda$, must be determined. In an exemplary embodiment, the data variance is $\sigma^2$, and $\Delta$ is the threshold when the variance is significant enough that the data should be decayed to a minimal significance value during the time window. This means the initial significance value $b_0$ shall be decayed to a very small value, $\eta$.

Normalizing the variance to the range of [$\eta$, $b_0$], $$\frac{(\Delta - \sigma^2) - 0}{\Delta - 0} = \frac{x - \eta}{b_0 - \eta} \Rightarrow x = (\Delta - \sigma^2) \cdot \frac{b_0 - \eta}{\Delta} + \eta.$$

Therefore, $\lambda$ is given by:

$$b_0 e^{-\lambda t} = \eta \Rightarrow \lambda = -\frac{1}{t} \ln \frac{\eta}{b_0}, \text{ if } \Delta - \sigma^2 < 0,$$

$$b_0 e^{-\lambda t} = (\Delta - \sigma^2) \cdot \frac{b_0 - \eta}{\Delta} + \eta \Rightarrow \lambda, \text{ and}$$

$$\lambda = -\frac{1}{t} \ln \left[ \frac{1}{b_0} \cdot \left( (\Delta - \sigma^2) \cdot \frac{b_0 - \eta}{\Delta} + \eta \right) \right], \text{ if } \Delta - \sigma^2 > 0.$$

Figure 3:
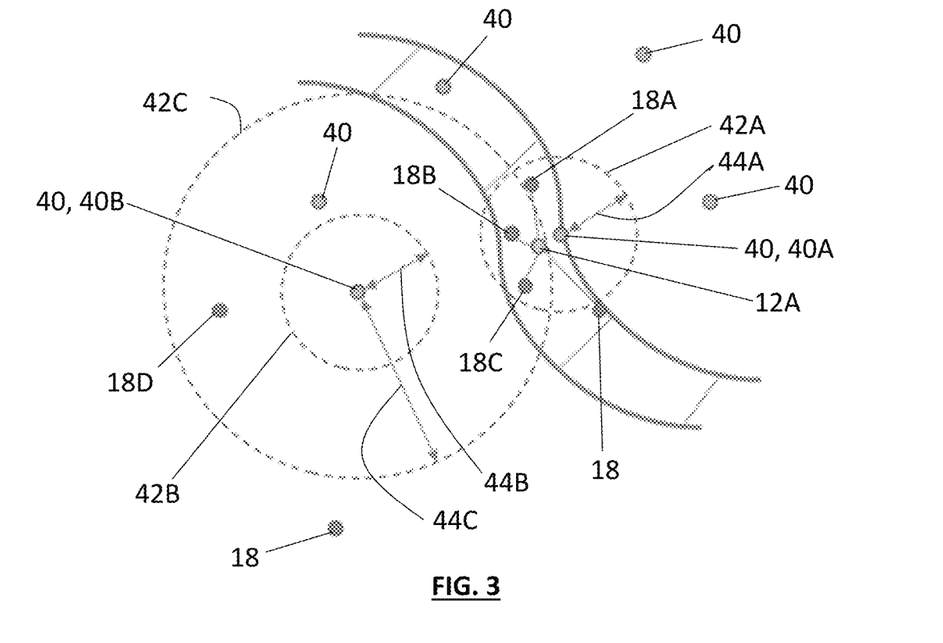
FIG. 3 is a schematic diagram of a target vehicle, nearby locations for which actual weather data is available, and nearby locations for which actual weather data is not available.

Most data is collected on travelled roadways. To estimate other locations and less travelled roads, the computer processor 16 interpolates the two-dimensional area with temporal-spatial estimations. Referring to FIG. 3, a target vehicle is indicated at 12A. Randomly or evenly distributed unknown locations are indicated at 40. Locations with known measurements from other vehicles or sources (weather stations, APIs, etc.) are indicated at 18. Within a first two-dimensional area 42A, defined by a first radius 44A, a first unknown location is indicated at 40A. Neighbors are searched for within the first two-dimensional area 42A to identify M locations 18 with known measurements. As shown, within the first two-dimensional area 42A, there are three locations with known measurements 18A, 18B, 18C. When M (a configurable threshold) is equal to three (for this example), these three known locations 18A, 18B, 18C can be used to generate estimated measurements of the first unknown location 40A and significance values can be calculated, as discussed above.

Looking at a second unknown location 40B, within a second two-dimensional area 42B, defined by a second radius 44B, no locations 18 with known measurements are identified. Thus, the two-dimensional area 42B is increased in size until M locations 18 with known measurements are identified. As shown, a third two-dimensional area 42C, defined by a third radius 44C, includes three locations with known measurements 18B, 18C, 18D, which can be used to generate estimated measurements of the second unknown location 40B and significance values can be calculated, as discussed above.

The computer processor uses the estimated measurements to provide information back to the target vehicle 12A, as indicated by arrow 46 in FIG. 1. The system 10 provides information to the infotainment system 22A within the target vehicle 12A to allow a driver/passenger within the target vehicle 12A to receive information about remote locations to which the target vehicle may be travelling and to better predict the current and future weather conditions for the target vehicle 12A at its' current location. In addition, aggregate information collected and analyzed by the computer processor 16 may be uploaded to external sources 48, as indicated by arrow 50, to allow access to such information by others who need/want access to more accurate weather information and predictions.

Figure 4:
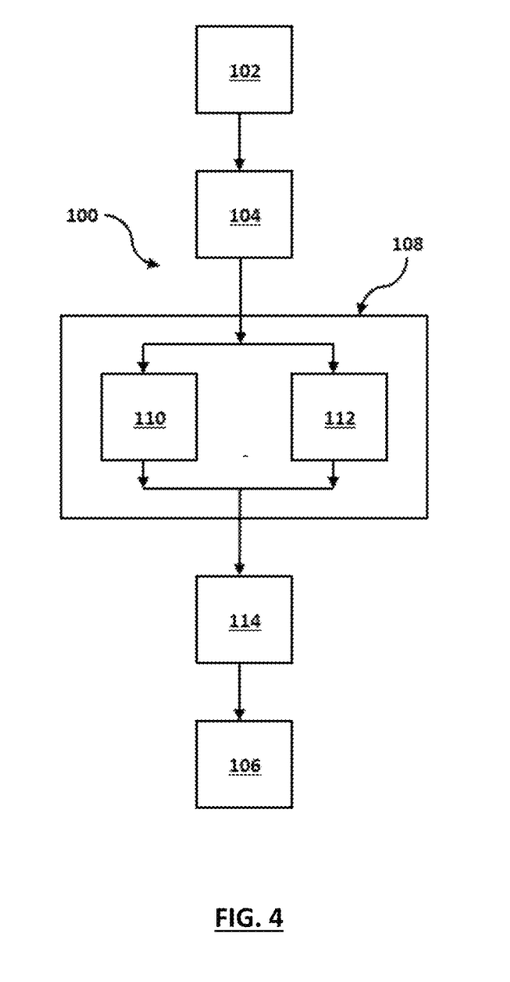
FIG. 4, is a flow chart diagram illustrating a method according to an exemplary embodiment of the present disclosure.

Referring to FIG. 4, a method 100 of providing weather conditions to a target vehicle 12A includes, beginning at block 102, collecting, with a computer processor 16, data of weather conditions at a target vehicle 12A with a plurality of sensors 14A mounted within the target vehicle 12A. Moving to block 104, the method 100 further includes collecting, with the computer processor 16, data of measured weather conditions of at least one known location 18 remote from the target vehicle 12A. Finally, moving to block 106, the method 100 includes building, with the computer processor 16, a temporal-spatial effectiveness model to estimate weather conditions of at least one unknown location remote from the target vehicle 12A using the data of weather conditions at the target vehicle 12A and the data of measured weather conditions of the at least one known location 18 remote from the target vehicle 12A.

Moving to block 108, in an exemplary embodiment, the method 100 further includes filtering the data of weather conditions at the target vehicle 12A during a cold start event of the target vehicle 12A by ignoring the data of weather conditions at the target vehicle 12A until the plurality of sensors 14A within the target vehicle 12A become acclimated.

Moving to block 110, in an exemplary embodiment, filtering of the data of weather conditions at the target vehicle 12A during a cold start event of the target vehicle 12A by ignoring the data of weather conditions at the target vehicle 12A until the plurality of sensors 14A within the target vehicle 12A become acclimated further includes comparing the data of weather conditions at the target vehicle 12A to the data of measured weather conditions of the at least one known location 18 remote from the target vehicle 12A, and ignoring the data of weather conditions at the target vehicle 12A when the data of weather conditions at the target vehicle 12A are unreliable in light of the data of measured weather conditions of the at least one known location 18 remote from the target vehicle 12A.

Moving to block 112, in another exemplary embodiment, filtering the data of weather conditions at the target vehicle 12A during a cold start event of the target vehicle 12A by ignoring the data of weather conditions at the target vehicle 12A until the plurality of sensors 14A within the target vehicle 12A become acclimated further includes accessing a model 34 that predicts an acclimation delay time vs. an average speed of the target vehicle, tracking the average speed of the target vehicle, and ignoring the data of weather conditions at the target vehicle 12A for an acclimation delay time based on the tracked average speed of the target vehicle starting at a cold start event of the target vehicle 12A.

In an exemplary embodiment, the collecting, with the computer processor 16, data of measured weather conditions of at least one known location 18 remote from the target vehicle 12A at block 102 further includes communicating, via a wireless network, with at least one other vehicle 12B, 12C, and collecting measured weather conditions from the at least one other vehicle 12B, 12C.

In an exemplary embodiment, the collecting, with the computer processor 16, data of measured weather conditions of at least one known location 18 remote from the target vehicle 12A at block 104 further includes communicating, via a wireless network, with at least one source 28A, 28B, 28C that collects and reports weather conditions, and collecting measured weather conditions from the at least one source 28A, 28B, 28C that collects and reports weather conditions.

The computer processor 16 is located within an edge/cloud-based infrastructure 20, and receives data from the plurality of sensors 14A within the target vehicle 12A by communicating, with the infotainment system 22A within the target vehicle 12A, via a wireless network.

In an exemplary embodiment, the building, with the computer processor 16, a temporal-spatial effectiveness model to estimate weather conditions of at least one unknown location 18 remote from the target vehicle 12A using the data of weather conditions at the target vehicle 12A and the data of measured weather conditions of the at least one known location 18 remote from the target vehicle 12A at block 106 further includes interpolating temporal-spatial estimations across a pre-defined two-dimensional area.

In an exemplary embodiment, moving to block 114, the method 100 further includes calculating a significance value for the data of measured weather conditions, and, in another exemplary embodiment, when calculating the significance value, the method 100 includes isolating effects of temporal decay and spatial decay on the significance value.

Moving again to block 106, when building, with the computer processor 16, a temporal-spatial effectiveness model to estimate weather conditions of at least one unknown location remote from the target vehicle 12A using the data of weather conditions at the target vehicle 12A and the data of measured weather conditions of the at least one known location 18 remote from the target vehicle 12A, the method 100 further includes aggregating data of measured weather conditions of the at least one known location 18 remote from the target vehicle 12A within the pre-determined two-dimensional area.

A system 10 and method 100 of the present disclosure offers the advantages of determining weather conditions at and near a target vehicle 12A by using data collected from connected data sources 28A, 28B, 28C and connected vehicles 12B, 12C to determine weather conditions at a target vehicle 12A and at locations near a target vehicle 12A for which actual data is not available, and filters data collected from vehicle sensors 14A until such sensors 14A have acclimated to the surrounding weather conditions.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for providing weather conditions to a target vehicle, comprising:
    collecting, with a computer processor, data of weather conditions at the target vehicle with a plurality of sensors mounted within the target vehicle including at least one vehicle speed sensor, by communicating, via a wireless network, with an infotainment system in the target vehicle;
    collecting, with the computer processor, data of measured weather conditions of at least one known location remote from the target vehicle by communicating, via the wireless network, with at least one other vehicle and collecting measured weather conditions from the at least one other vehicle; and
    accessing a model that predicts an acclimation delay time versus an average speed of the target vehicle;
    tracking the average speed of the target vehicle;
    building, with the computer processor, a temporal-spatial effectiveness model using the data of weather conditions at the target vehicle and the data of measured weather conditions of the at least one known location remote from the target vehicle and ignoring the data of weather conditions at the target vehicle for an acclimation delay time based on the tracked average speed of the target vehicle starting at a cold start event of the target vehicle when building the temporal-spatial effectiveness model;
    estimating weather conditions of at least one unknown location remote from the target vehicle using the temporal-spatial effectiveness model; and
    communicating, via an infotainment system in the target vehicle, the estimated weather conditions of the at least one unknown location remote from the target vehicle to a Passenger in the target vehicle.

2. The method of claim 1, wherein the collecting, with the computer processor, data of measured weather conditions of at least one known location remote from the target vehicle further includes:
    communicating, via the wireless network, with at least one non-vehicle source that collects and reports weather conditions; and
    collecting measured weather conditions from the at least one non-vehicle source that collects and reports weather conditions.

3. The method of claim 1, wherein the computer processor is located within an edge/cloud-based infrastructure, the method further including communicating with the infotainment system within the target vehicle via the wireless network.

4. The method of claim 3, wherein the building, with the computer processor, a temporal-spatial effectiveness model to estimate weather conditions of at least one unknown location remote from the target vehicle using the data of weather conditions at the target vehicle and the data of measured weather conditions of the at least one known location remote from the target vehicle further includes interpolating temporal-spatial estimations across a pre-defined two-dimensional area.

5. The method of claim 4, further including calculating a significance value for the data of measured weather conditions.

6. The method of claim 5, wherein building, with the computer processor, a temporal-spatial effectiveness model to estimate weather conditions of at least one unknown location remote from the target vehicle using the data of weather conditions at the target vehicle and the data of measured weather conditions of the at least one known location remote from the target vehicle further includes aggregating data of measured weather conditions of the at least one known location remote from the target vehicle within the pre-determined two-dimensional area.

7. The method of claim 6, wherein the calculating a significance value for the data of measured weather conditions further includes isolating effects of temporal decay and spatial decay on the significance value.

8. A system for providing weather conditions comprising:
a target vehicle having:
- a plurality of sensors mounted within the target vehicle adapted to measure weather conditions at the target vehicle and a speed of the target vehicle; and
- an infotainment system connected to the plurality of sensors and in communication with a wireless network;

a remote vehicle having:
- a plurality of sensors mounted within the remote vehicle adapted to measure weather conditions at the remote vehicle; and
- an infotainment system connected to the plurality of sensors and in communication with the wireless network;

a computer processor located within an edge/cloud-based infrastructure, the computer processor having a processor and a memory, the memory including instructions such that the processor is programmed to:
- collect data of weather conditions at the target vehicle from the plurality of sensors mounted within the target vehicle via the wireless network;
- collect data of weather conditions at the remote vehicle from the plurality of sensors mounted within the remote vehicle via the wireless network;
- access a model that predicts an acclimation delay time vs. an average speed of the target vehicle;
- track the average speed of the target vehicle;
- build a temporal-spatial effectiveness model using the data of weather conditions at the target vehicle and the data of measured weather conditions of the remote vehicle and ignoring the data of weather conditions at the target vehicle for an acclimation delay time based on the tracked average speed of the target vehicle starting at a cold start event of the target vehicle when building the temporal-spatial effectiveness model;
- estimate weather conditions of at least one unknown location remote from the target vehicle using the temporal-spatial effectiveness model; and
- communicate the estimated weather conditions of the at least one unknown location remote from the target vehicle to the infotainment system in the target vehicle.

9. The system of claim 8, wherein the processor is further programmed to communicate via the wireless network with at least one other source that collects and reports weather conditions and collect measured weather conditions from the at least one other source that collects and reports weather conditions, and to build the temporal-spatial effectiveness model additionally using the measured weather conditions from the at least one other source.

10. The system of claim 8, wherein the processor is further programmed to interpolate temporal-spatial estimations across a pre-defined two-dimensional area when building the temporal-spatial effectiveness model.

11. The system of claim 10, wherein the processor is further programmed to calculate a significance value for the data of measured weather conditions and to isolate effects of temporal decay and spatial decay on the significance value.

12. The system of claim 11, wherein, the processor is further programmed to aggregate data of measured weather conditions of the at least one known location remote from the target vehicle within a pre-determined two-dimensional area when building the temporal-spatial effectiveness model.

* * * * *